United States Patent [19]

Hunt, III

[11] 4,373,586

[45] Feb. 15, 1983

[54] METHOD OF SOLVENT FLOODING TO RECOVER VISCOUS OILS

[75] Inventor: William C. Hunt, III, Dallas, Tex.

[73] Assignee: Mobil Oil Corporation, New York, N.Y.

[21] Appl. No.: 290,758

[22] Filed: Aug. 7, 1981

[51] Int. Cl.³ .............................................. E21B 43/22
[52] U.S. Cl. .................................. 166/263; 166/271; 166/274
[58] Field of Search ......... 166/263, 268, 269, 271-274

[56] References Cited

U.S. PATENT DOCUMENTS

| | | | |
|---|---|---|---|
| 2,897,894 | 8/1959 | Draper et al. | 166/272 |
| 3,245,467 | 4/1966 | Fitch | 166/273 |
| 3,500,916 | 3/1970 | Van der Knapp et al. | 166/272 |
| 3,500,917 | 3/1970 | Lehner et al. | 166/272 |
| 3,771,598 | 11/1973 | McBean | 166/272 X |
| 3,838,738 | 10/1974 | Redford et al. | 166/272 X |
| 3,997,004 | 12/1976 | Wu | 166/272 |
| 4,026,358 | 5/1977 | Allen | 166/273 |
| 4,127,170 | 11/1978 | Redford | 166/272 X |
| 4,241,790 | 12/1980 | Magnie | 166/263 X |
| 4,293,035 | 10/1981 | Fitch | 166/273 |

Primary Examiner—Stephen J. Novosad
Assistant Examiner—George A. Suchfield
Attorney, Agent, or Firm—Charles A. Huggett; James F. Powers, Jr.; Lawrence O. Miller

[57] ABSTRACT

Oil may be recovered from viscous oil-containing formations including tar sand deposits by first establishing a fluid communication path in the lower portion of the formation intermediate at least one injection well and a production well. At least one additional interior production well in fluid communication with the upper portion of the formation is drilled within the formation defined by the injection well and production well. A hydrocarbon solvent having a density less than oil contained in the formation under formation conditions is injected into the fluid communication path via an injection well and fluids including oil are recovered from the production well until solvent is detected in the fluid recovered. Thereafter, the production well is shut-in and the interior production well is opened to production for recovering fluid including oil while solvent is continued to be injected into the fluid communication path via the injection well until the fluid recovered from the interior production well contains a predetermined amount of solvent. The injection well, production well, and interior production well are shut-in to permit the formation to undergo a soak period for a variable time, preferably from 1 to 10 days per vertical thickness in feet of the viscous oil-containing formation. Thereafter, a driving fluid such as water is injected into the formation and oil is produced via the production well until there is an unfavorable ratio of oil to driving fluid.

38 Claims, 1 Drawing Figure

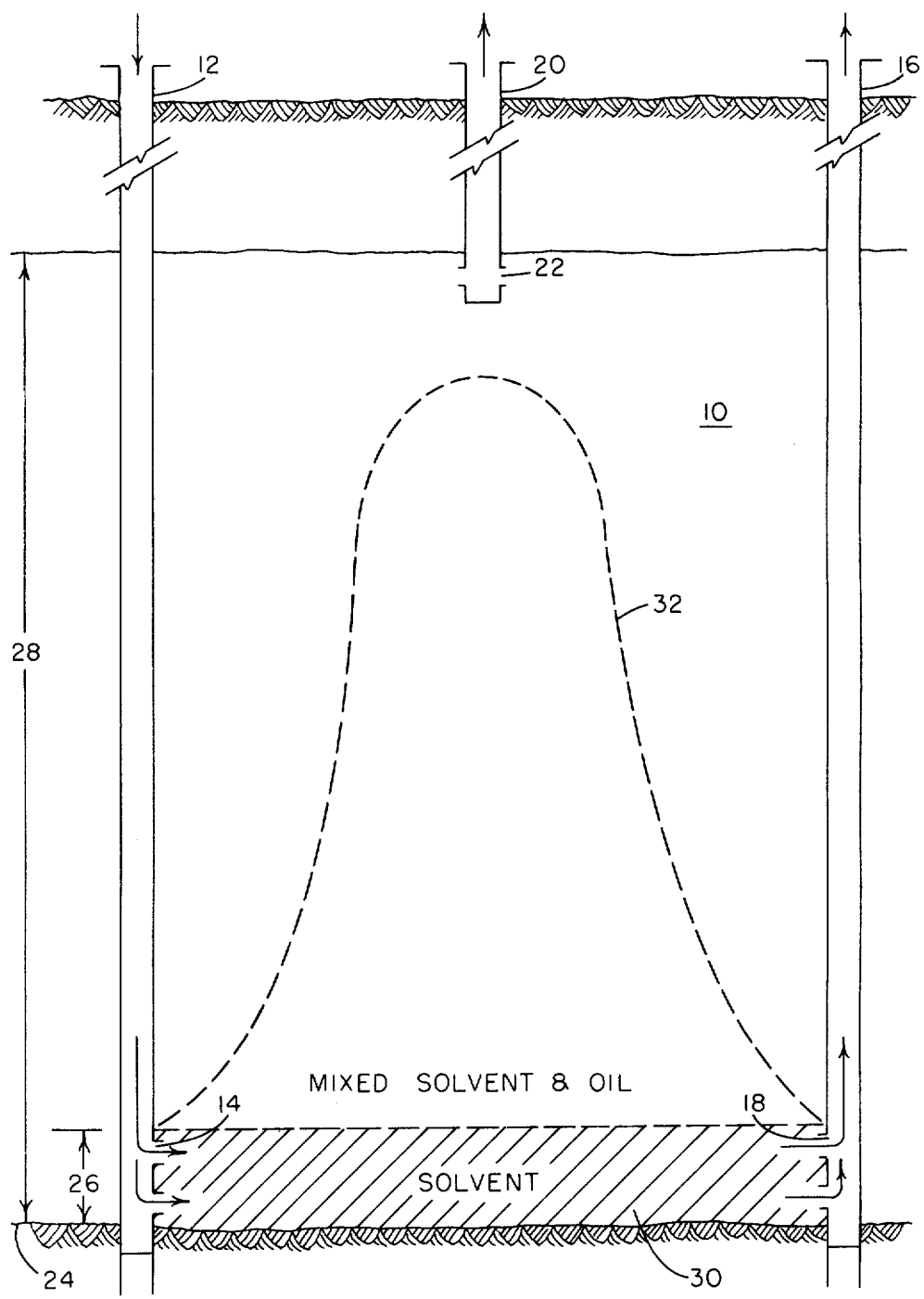

METHOD OF SOLVENT FLOODING TO RECOVER VISCOUS OILS

BACKGROUND OF THE INVENTION

1. Field of the Invention

This invention is directed to a method of recovering oil from viscous oil-containing subsurface formations. More particularly, this invention is directed to an improved hydrocarbon solvent recovery method for recovering oil from subsurface formations that are penetrated by at least one injection well, one production well, and one interior production well which extend from the surface of the earth and into the subsurface formation containing viscous hydrocarbons.

2. Description of the Prior Art

In copending application Ser. No. 285,696, filed July 22, 1981, to John L. Fitch, et al., there is disclosed a method of recovering viscous oil from a viscous oil-bearing subsurface formation wherein a predetermined amount of solvent is injected into a fluid communication path formed in the bottom of the formation intermediate an injection well and a production well. Thereafter, the formation is allowed to undergo a soak period for a time sufficient for gravity-driven convection to substantially mix the solvent with the oil in the formation thereby reducing its viscosity. The less viscous formation oil is then recovered by a fluid drive process utilizing a gas or liquid as the driving fluid.

In copending application Ser. No. 46,275, now U.S. Pat. No. 4,293,034, filed June 7, 1979, to John L. Fitch, there is disclosed a method of recovering viscous oil from a viscous oil-bearing subsurface formation wherein a solvent is injected into a high mobility channel formed in the bottom of the formation intermediate an injection well and a production well. The solvent is injected until the ratio of produced oil to solvent becomes unfavorable and thereafter the injection of solvent is terminated and gas is injected into the high mobility channel to produce solvent and oil from the formation. In U.S. Pat. No. 3,838,738 there is described a method for recovering viscous petroleum from petroleum-containing formations by first establishing a fluid communication path low in the formation. A heated fluid is then injected into the fluid communication path followed by injecting a volatile solvent such as carbon disulfide, benzene, or toluene into the preheated flow path and continuing injecting the heating fluid and recovering fluids including petroleum from the production well.

In U.S. Pat. No. 3,500,917 there is disclosed a method for recovering crude oil from an oil-bearing formation having a water-saturated zone underlying the oil-saturated zone. A mixture of an aqueous fluid which has a density greater than the density of the crude oil and a solvent having a density less than the density of the crude oil are injected into the water-saturated zone and oil is produced from the formation.

U.S. Pat. No. 4,026,358 discloses a method for recovering heavy oil from a subterranean hydrocarbon-bearing formation traversed by at least one injection well and one production well wherein a slug of hydrocarbon solvent in amounts of 0.1 to about 20 percent of the formation pore volume and having a gas dissolved therein is injected into the formation via the injection well. Thereafter, a thermal sink is created in the formation by in-situ combustion or by injecting steam. The wells are then shut-in for a predetermined time to permit the formation to undergo a soak period, after which production is continued. Optionally, after the production period, the formation may be water-flooded to recover additional oil from the formation.

SUMMARY OF THE INVENTION

My invention involves a solvent flood oil-recovery process for recovering a viscous oil from a viscous oil-containing formation that has no significant vertical permeability barrier in the portion of the formation to be treated, involving at least one injection well and at least one spaced-apart production well for injecting a hydrocarbon solvent into a fluid communication path in the lower portion of the formation and recovering oil from the formation. The improvement comprises employing a third well or plurality of wells, referred to herein as an interior production well, drilled into the upper portion of the oil-containing formation between injection and production wells to achieve more efficient mixing of the solvent in the formation whereby solvent more readily migrates upward through the formation by gravity-convection and dissolves the viscous oil contained therein reducing its viscosity and permitting improved flow of the less viscous oil to the surface of the earth by a fluid drive process. A fluid communication path is established through the lower portion of the formation between the injection well and production well, and a hydrocarbon solvent, liquid under formation conditions, and having a specific gravity less than the oil contained in the formation is injected via the injection well into this path and fluids including oil are recovered from the formation via the production well until solvent is detected in the produced fluid. When this occurs, production is terminated and the production well is shut-in. Injection of solvent is continued and fluid including oil is recovered from the formation via the interior production well which is in fluid communication with the upper portion of the formation until the fluid recovered contains a predetermined amount of solvent, preferably from 5 to 10 percent by volume. Thereafter, production via the interior production well and injection of solvent via the injection well is terminated. The injection well, production well, and interior production well are shut-in to permit the formation to undergo a soak period for a time sufficient for gravity-driven convection to substantially mix the solvent with the oil in the formation and thereby reduce its viscosity and increase its mobility, preferably for a period of time between 1 to 10 days per vertical thickness in feet of the viscous oil-containing formation. During this soak period, the light hydrocarbon solvent will tend to rise and the heavy oil will move downward in a gravity-driven convection process forming a pattern of fingers. This fingering causes a more effective contact between the oil and solvent thus providing a greater volume of oil that is reduced in viscosity and which can be produced more readily. Thereafter, a driving fluid such as water is injected into the injection well to displace the mixture of oil and solvent toward the production well for recovery. Production is continued until the fluid including oil recovered from the production well contains an unfavorable ratio of oil to driving fluid In a variation of the process, a predetermined amount of solvent is injected into the formation, preferably in a total amount of 0.05 to 0.30 pore volume. During the fluid drive recovery process, the injection well and production well may be in fluid communication with essentially the entire oil-containing formation and the fluid communication path between the injection well and production well closed off.

BRIEF DESCRIPTION OF THE DRAWING

The drawing represents a cross-sectional view of a subsurface oil-containing formation with the improved solvent recovery method depicted therein.

DESCRIPTION OF THE PREFERRED EMBODIMENTS

The process of my invention may best be understood by referring to the attached drawing which illustrates a minimum three-well unit for employing the process of my invention, wherein a viscous oil-containing formation that has no significant vertical permeability barriers is penetrated by an injection well 12 which is in fluid communication with the lower portion of the formation through performations 14, a production well 16 which is in fluid communication with the lower portion of the formation through perforations 18, and an interior production well 20 which is in fluid communication with the upper portion of the formation through perforations 22. For both the injection well 12 and the production well 16, the distance in which the perforations are formed above the bottom 24 of the viscous oil-containing formation 10 designated as 26 in the drawing is no longer than 10 percent of the total thickness 28 of the viscous oil-containing formation.

The drawing illustrates how interior production well 20 is drilled into the formation 10, with respect to injection well 12 and production well 16. Interior production well 20 must be drilled into the recovery zone within the formation 10 defined by injection well 12 and production well 16. It is not essential that interior production well 20 be located on a line between injection well 12 and production well 16, and may be offset in either direction from a straight line arrangement, although it is preferred that interior production well is in alignment with wells 12 and 16. Similarly, it is not essential that well 20 be located exactly midway between injection well 12 and production well 16 although it is preferred that interior well 20 be from 40 to 60 percent of the distance between injection well and production well. It is also within the scope of my invention to use a plurality of interior productions located between injection and production wells using the process as described herein.

A fluid communication path 30 is established intermediate the injection and production wells 12 and 16 through the lower portion of the viscous oil-containing formation 10. Thereafter, a hydrocarbon solvent which is liquid at formation temperature and injection pressure and having a specific gravity less than the specific gravity of the oil contained in the formation 10 is injected via the injection well 12 through the fluid communication path 30 and fluid including oil is recovered from the formation via the production well 16. Solvent injection via injection well 12 and recovering fluid including oil from the formation by means of production well 16 is continued until solvent breaks through at the production well 16. A tracer can be incorporated in the solvent to aid in its detection in the fluid recovered from the production well 16. Once solvent is detected in the fluid being produced from well 16, production is terminated and well 16 is shut-in.

Thereafter, solvent is continued to be injected into the formation 10 via injection well 12 through the fluid communication path 30 and fluid including oil is recovered from the formation via interior production well 20 through perforations 22. The solvent having a specific gravity less than the specific gravity of the oil contained in the formation will tend to finger upward into the oil-containing formation by gravity-driven convection aided by the production of well 22 in fluid communication with upper portion of the formation. As solvent moves upward through the formation 10 toward perforations 22 in production well 10, it dissolves viscous oil, forming a bank of oil and solvent as shown by the dashed lines 32 in the drawing in which the oil content increases as the bank moves upward from the immediate vicinity of the concentrated layer of solvent contained in the fluid communication path 30. Solvent injection and production of oil from well 20 are continued until the fluid recovered from well 20 contains a predetermined amount of solvent, preferably from 5 to 10 percent by volume. Once the amount of solvent in the fluid being produced from the formation by means of well 20 increases to a predetermined value, production of fluids from the formation by means of well 20 and injection of solvent into the formation by means of well 12 is terminated.

Thereafter, all three wells, 12, 16 and 20, are shut-in to permit the formation to undergo a soak period for a time sufficient for gravity-driven convection to further substantially mix the solvent with the oil in the formation and thereby reduce its viscosity and increase its mobility, preferably for a period of time between 1 to 10 days per vertical thickness in feet of the viscous oil-containing formation 10. It will be recognized by those skilled in the art of oil recovery that during this shut-in or soak period minor amounts of injection or production fluid, such as for the purpose of testing, may be done without significant detrimental effects on the process. During the soak period, the liquid hydrocarbon solvent being lighter than the oil contained in the viscous oil-containing formation, that is, having a specific gravity less than the specific gravity of the oil under formation conditions, will tend to flow by gravity-driven convection upward into the oil-containing formation and the heavy oil will flow by gravity-driven convection downward to obtain more efficient mixing between the oil and solvent. Furthermore, because of viscous instabilities, the rising hydrocarbon solvent and descending heavy oil form a pattern of fingers. This fingering is important in that the distribution, size and extension of these fingers will provide intimate contact between the solvent and the heavy oil allowing the two to mix more effectively, thus forming a greater volume of oil that is reduced in viscosity and which can be produced more readily. This relatively low viscosity mixture can be much more effectively displaced from the reservoir than the original heavy oil by flooding the formation with water or other suitable fluid, as is well known to those skilled in the art of petroleum engineering.

Once the soak period has been completed, a driving fluid is injected into the fluid communication path 30 via the injection well 12 and fluid including oil and hydrocarbon solvent is recovered from the production well 16. It is preferred that additional perforations may be added to the injection well 12 or the production well 16, or both if desired, to establish fluid communication between both wells and the full thickness of the oil-containing formation and thus obtain a more uniform displacement of the mobilized reservoir oils by the driving fluid. In still another embodiment, the portion of the injection well 12 and production well 16 in fluid communication with the fluid communication path 30 in the lower portion of the formation 10 is sealed-off by cementing or other means, and perforations or other fluid communication means are established between both wells and the remaining portion of the oil-containing formation. The driving fluid displaces both the oil and hydrocarbon solvent from the viscous oil-containing formation into the production well 16 and production is continued until the recovered fluid contains an unfavorable ratio of oil to driving fluid. The driving fluid for use in my invention may be gaseous or liquid. For example, gases include light aliphatic hydrocarbons having from one to four carbon atoms; carbon dioxide and nitrogen may be used for the process of my invention. Aqueous fluids are particularly preferred driving fluids in the process of my invention. Water, brine and thickened aqueous fluids are all suitable aqueous fluids for the purpose of my invention.

The fluid communication path 30 through the lower portion of the viscous oil-containing subsurface formation 10 may be formed by injecting a brine having a specific gravity greater than the specific gravity of the oil in the subsurface formation via the injection well 12 and through the perforations therein and into the oil-containing subsurface formation until the brine breaks through at the production well 16. In some formations, brine may underlie the oil contained in the subsurface formation 10. In such cases, an oil-water contact will exist in the formation 10 and no additional brine need be injected into the formation to establish the fluid communication path 30. In such cases, it will be considered that the fluid communication path 30 is established by determining the existence of the oil-water content and the brine-filled portion of the formation that underlies the oil-containing formation.

In the case of an oil-containing formation that is underlain by brine and thus has an oil-water contact, the injection well is perforated and the perforation interval is provided adjacent the underlying water. Desirably, the upper perforations of this perforation interval are located about adjacent the oil-water contact though it could extend somewhat above this oil-water contact without seriously affecting the efficiency of the present recovery method. The production well is perforated and the perforation interval is provided adjacent the oil-water contact such that the lower perforation of this interval is located slightly above the oil-water contact. Again, in the case of a formation underlain by brine, as it was with the formation that was not underlain by brine, the perforation intervals that are provided in the injection and production wells desirably are no longer than about 10 percent of the total thickness of the viscous oil-containing formation. It is preferred that prior to initiation of the driving fluid phase in order to ensure that the optimum displacement occurs in the formation, that fluid communication be established in a relative uniform fashion over the entire thickness of the oil-saturated interval adjacent the injection well or production well, or both if desired. Therefore, perforations should be formed above the perforations originally formed in the lower portion of both wells adjacent the oil-water contact. Also, it may be desirable to close-off the perforations in the lower portion of both wells that are in fluid communication with the oil-water contact by cementing or any other suitable means. Perforations should then be formed above the perforations closed-off so as to establish relative uniform fluid communication between both wells 12 and 16 and the remaining vertical thickness of the oil-containing formation.

In the case of a formation underlain by brine which forms a fluid communication path between the injection and production wells, the hydrocarbon solvent is selected to have a specific gravity less than that of the brine in addition to being less than that of the oil contained in the viscous oil-containing formation. The hydrocarbon solvent is injected via the injection well into this brine-filled communication path and the process is continued in the same manner described above for the formation which is not underlain by water.

The hydrocarbon solvents used in my process must have a specific gravity less than that of the oil and less than that of the brine-injected or naturally present in the formation under formation conditions. It is also highly desirable that the hydrocarbon solvent remain liquid under the temperature and pressure conditions that exist in the subsurface viscous oil-containing formation and not cause solids such as asphaltenes to precipitate from the oil in amounts sufficient to seriously plug the pores of the formation. The preferred hydrocarbon solvent is a light crude oil. Other examples of suitable hydrocarbon solvents include light oil condensates having an API gravity greater than 30 API degrees and partially refined tar which is generally known as syncrude. It may be desirable to include in the hydrocarbon solvent up to about 10 percent of aromatic material such as aromatic refinery stock to make the solvent compatible with the oil contained in the formations and to prevent the deposition of solid or gelatinous materials such as asphaltenes therefrom.

The viscous oil-containing subsurface formation to be treated by the present hydrocarbon solvent recovery method must be one that has no significant vertical permeability barriers in that portion of the formation to be treated. This allows the solvent that is injected into the fluid communication path formed between the injection well and production well to flow upward into the formation by convection forces, thus solubilizing the oil and forming a solvent-oil mixture of reduced viscosity that can be more readily produced by a fluid drive process.

Another variation of the above-described process involves injecting a predetermined total amount of solvent into the formation after there has been a breakthrough of solvent at production well 16 and while interior production well 20 is opened for production. In this embodiment, after the initial step of injecting solvent into the formation 10 until solvent is detected at production well 16 and the production well is shut-in, injection of solvent is continued and fluids recovered from interior production well 20 until a total quantity of solvent, liquid under formation conditions, has been injected into the formation. The total amount of solvent injected into the formation is preferably within the range of 0.05 to 0.30 pore volume. Thereafter, all three wells, 12, 16 and 20, are shut-in and the steps of a soak period followed by a fluid drive process for recovering the mobilized oil from the formation are conducted according to my process as previously described.

Thus, I have disclosed how significantly more viscous oil may be recovered from an oil formation by injecting a solvent into an established fluid communication path in the lower portion of a formation between an injection well and a production well and employing an interior production well located between injection and production wells in fluid communication with the upper portion of the formation to increase the efficiency of the migration of the solvent into the viscous oil contained in the formation by gravity-convection thereby decreasing the viscosity of the oil and making it more mobile for subsequent recovery by a fluid drive process.

The method according to the invention is not restricted to the use in the field in which only three wells penetrate the formation. Any other number of wells, which may be arranged according to any pattern, may be applied in using the present method as illustrated in U.S. Pat. No. 3,927,716 to Burdyn et al. By the term "pore volume" as used herein, is meant that volume of the portion of the formation underlying the well pattern employed, as described in greater detail in the Burdyn et al. patent.

What is claimed is:

1. A method of recovering viscous oil from a viscous oil-containing subsurface formation, said formation having no significant permeability barrier therein, and penetrated by at least one injection well and one production well comprising:
   (a) establishing a fluid communication path extending between the injection well and the production well near the lower portion of said oil-containing formation;
   (b) providing an interior production well located between the injection well and production well in fluid communication with the upper portion of the oil-containing formation;
   (c) injecting a hydrocarbon solvent via said injection well into said fluid communication path, said solvent having a specific gravity less than the specific gravity of the oil contained in the formation under formation conditions;
   (d) recovering fluids including oil from the fluid communication path via the production well until solvent is detected in the fluid recovered from the production well and thereafter shutting-in said production well;
   (e) continuing to inject hydrocarbon solvent into the fluid communication path via said injection well and recovering fluid including oil from the formation via said interior production well until the fluid being recovered from the interior production well comprises a predetermined amount of solvent;
   (f) shutting-in the injection well and the interior production well along with the production well to permit said formation to undergo a soak period for a time sufficient for gravity-driven convection to substantially mix the solvent with the oil in the formation and thereby reduce its viscosity; and
   (g) thereafter injecting a driving fluid into the formation via said injection well and recovering fluid including oil from the formation via said production well until the fluid being recovered comprises an unfavorable ratio of produced oil to driving fluid.

2. The method of claim 1 wherein the fluid communication path of step (a) is stablished in the lower 10 percent of the oil-containing formation.

3. The method of claim 1 wherein the recovery of fluid from the interior production well as defined in step (e) is continued until the solvent content reaches from 5 to 10 percent by volume.

4. The method of claim 1 wherein said fluid communication path is established by injecting a brine having a density greater than the density of said oil into the lower portion of said subsurface formation and continuing to inject said brine until breakthrough at said production well.

5. The method of claim 1 wherein the soak period as defined in step (f) is for a period of time between 1 and 10 days per vertical thickness in feet of the oil-containing formation.

6. The method of claim 1 wherein the driving fluid is a gaseous material selected from the group consisting of carbon dioxide, nitrogen or aliphatic hydrocarbons having one to four carbon atoms.

7. The method of claim 1 wherein the driving fluid is water.

8. The method of claim 1 wherein said hydrocarbon solvent is selected from the group consisting of a light crude oil having an API gravity greater than 30 API degrees and a light crude oil product generally known as syncrude.

9. The method of claim 1 wherein said driving fluid injected during step (g) is injected into the fluid communication path between the injection well and the production well.

10. The method of claim 1 further comprising the additional step of establishing fluid communication in the injection well and the production well substantially throughout the entire thickness of the oil-containing formation prior to injection of the driving fluid as defined in step (g).

11. The method of claim 1 further comprising the additional steps of closing off the fluid communication between the injection well and the production well in the lower portion of the formation and establishing fluid communication in the injection well and the production well throughout the full thickness of the oil-containing formation prior to injection of the driving fluid as defined in step (g).

12. The method of recovering viscous oil from a subsurface formation that contains a viscous oil portion and a mobile brine portion immediately therebelow, said formation having no significant permeability barriers therein, and penetrated by at least one injection well and a production well comprising:
   (a) providing an interior production well located between the injection well and production well in fluid communication with the upper portion of the oil-containing formation;
   (b) injecting a hydrocarbon solvent into said formation near the oil-water interface, said solvent having a specific gravity less than said oil and said brine contained in the formation under formation conditions;
   (c) recovering fluid including oil from the formation near the oil-water interface via said production well until solvent is detected in the fluid recovered from the production well and thereafter shutting-in said production well;
   (d) continuing to inject hydrocarbon solvent into said formation near the oil-water interface via said injection well and recovering fluid including oil from the formation via said interior production well until the fluid being recovered from the interior production well comprises a predetermined amount of solvent;
   (e) shutting-in the injection well and the interior production well along with the production well to permit said formation to undergo a soak period for a time sufficient for gravity-driven convection to substantially mix the solvent with the oil in the formation and thereby reduce its viscosity;

(f) thereafter injecting a driving fluid into the formation via said injection well and recovering fluid including oil from the formation via said production well until the fluid being recovered comprises an unfavorable ratio of produced oil to driving fluid.

13. The method of claim 12 wherein the recovery of fluid from the interior production well as defined in step (d) is continued until the solvent content reaches from 5 to 10 percent by volume.

14. The method of claim 12 wherein the soak period as defined in step (e) is for a period of time between 1 and 10 days per vertical thickness in feet of the oil-containing formation.

15. The method of claim 12 wherein the driving fluid is a gaseous material selected from the group consisting of carbon dioxide, nitrogen or aliphatic hydrocarbons having one to four carbon atoms.

16. The method of claim 12 wherein the driving fluid is water.

17. The method of claim 12 wherein said hydrocarbon solvent is selected from the group consisting of a light crude oil having an API gravity greater than 30 API degrees and a light crude oil product generally known as syncrude.

18. The method of claim 12 wherein said driving fluid injected during step (f) is injected into the formation near said oil-water interface via said injection well.

19. The method of claim 12 further comprising the additional step of establishing fluid communication in the injection well and the production well substantially throughout the entire thickness of the oil-containing formation prior to injection of the driving fluid as defined in step (f).

20. The method of claim 12 further comprising the additional steps of closing off the fluid communication between the injection well and the production well in the oil-water interface and establishing fluid communication in the injection well and the production well throughout the full thickness of the oil-containing formation prior to injection of the driving fluid as defined in step (f).

21. A method of recovering viscous oil from a viscous oil-containing subsurface formation, said formation having no significant permeability barrier therein, and penetrated by at least one injection well and one production well comprising:

(a) establishing a fluid communication path extending between the injection well and the production well near the lower portion of said oil-containing formation;

(b) providing an interior production well located between the injection well and production well in fluid communication with the upper portion of the oil-containing formation;

(c) injecting a hydrocarbon solvent via said injection well into said fluid communication path, said solvent having a specific gravity less than the specific gravity of the oil contained in the formation under formation conditions, and recovering fluids including oil from the fluid communication path via the production well until solvent is detected in the fluid recovered from the production well;

(d) thereafter shutting-in said production well;

(e) continuing to inject a quantity of said hydrocarbon solvent into the fluid communication path via said injection well and recovering fluids including oil from the formation via said interior production well;

(f) shutting-in the injection well and the interior production well along with the production well to permit said formation to undergo a soak period for a time sufficient for gravity-driven convection to substantially mix the solvent with the oil in the formation and thereby reduce its viscosity; and (g) thereafter injecting a driving fluid into the formation via said injection well and recovering fluid including oil from the formation via said production well until the fluid being recovered comprises an unfavorable ratio of produced oil to driving fluid.

22. The method of claim 21 wherein the fluid communication path of step (a) is established in the lower 10 percent of the oil-containing formation.

23. The method of claim 21 wherein the total amount of solvent injected during steps (c) (e) is between 0.05 and 0.30 pore volume and the soaking period during step (g) is for a period of time between 1 and 10 days per vertical thickness in feet of the oil-containing formation.

24. The method of claim 21 wherein the driving fluid is a gaseous material selected from the group consisting of carbon dioxide, nitrogen or aliphatic hydrocarbons having one to four carbon atoms.

25. The method of claim 21 wherein said fluid communication path is established by injecting a brine having a density greater than the density of said oil into the lower portion of said subsurface formation and continuing to inject said brine until breakthrough at said production well.

26. The method of claim 21 wherein the driving fluid is water.

27. The method of claim 21 wherein said hydrocarbon solvent is selected from the group consisting of a light crude oil having an API gravity greater than 30 API degrees and a light crude oil product generally known as syncrude.

28. The method of claim 21 wherein said driving fluid injected during step (g) is injected into the fluid communication path between the injection well and the production well.

29. The method of claim 21 further comprising the additional step of establishing fluid communication in the injection well and the production well substantially throughout the entire thickness of the oil-containing formation prior to injection of the driving fluid as defined in step (g).

30. The method of claim 21 further comprising the additional steps of closing off the fluid communication between the injection well and the production well in the lower portion of the formation and establishing fluid communication in the injection well and the production well throughout the full thickness of the oil-containing formation prior to injection of the driving fluid as defined in step (g).

31. A method of recovering viscous oil from a subsurface formation that contains a viscous oil portion and a mobile brine portion immediately therebelow, said formation having no significant permeability barriers therein, and penetrated by at least one injection well and a production well comprising:

(a) providing an interior production well located between the injection well and production well in fluid communication with the upper portion of the oil-containing formation;

(b) injecting a hydrocarbon solvent into said formation near the oil-water interface, said solvent having a specific gravity less than said oil and said brine contained in the formation under formation conditions, and recovering fluid including oil from the formation near the oil-water interface via said production well until solvent is detected in the fluid recovered from the production well;

(c) thereafter shutting-in said production well;

(d) continuing to inject a quantity of said hydrocarbon solvent into the formation near the oil-water interface via said injection well and recovering fluids including oil from the formation via said interior production well;

(e) shutting-in the injection well and the interior production well along with the production well to permit said formation to undergo a soak period for a time sufficient for gravity-driven convection to substantially mix the solvent with the oil in the formation and thereby reduce its viscosity; and (f) thereafter injecting a driving fluid into the formation via said injection well and recovering fluid including oil from the formation via said production well until the fluid being recovered comprises an unfavorable ratio of produced oil to driving fluid.

32. The method of claim 31 wherein the total amount of solvent injected during steps (b) and (d) is between 0.05 and 0.30 pore volume and the soaking period during step (g) is for a period of time between 1 and 10 days per vertical thickness in feet of the oil-containing formation.

33. The method of claim 31 wherein the driving fluid is a gaseous material selected from the group consisting of carbon dioxide, nitrogen or aliphatic hydrocarbons having one to four carbon atoms.

34. The method of claim 31 wherein the driving fluid is water.

35. The method of claim 31 wherein said hydrocarbon solvent is selected from the group consisting of a light crude oil having an API gravity greater than 30 API degrees and a light crude oil product generally known as syncrude.

36. The method of claim 31 wherein said driving fluid injected during step (f) is injected into the formation near said oil-water interface via said injection well.

37. The method of claim 31 further comprising the additional step of establishing fluid communication in the injection well and the production well substantially throughout the entire thickness of the oil-containing formation prior to injection of the driving fluid as defined in step (f).

38. The method of claim 31 further comprising the additional steps of closing off the fluid communication between the injection well and the production well in the oil-water interface and establishing fluid communication in the injection well and the production well throughout the full thickness of the oil-containing formation prior to injection of the driving fluid as defined in step (f).

* * * * *